United States Patent [19]

Spreen

[11] Patent Number: 4,703,409
[45] Date of Patent: Oct. 27, 1987

[54] COUPLED POWER SUPPLY INDUCTORS FOR REDUCED RIPPLE CURRENT

[75] Inventor: James H. Spreen, Stone Ridge, N.Y.

[73] Assignee: International Business Machines Corporation, Armonk, N.Y.

[21] Appl. No.: 925,032

[22] Filed: Oct. 30, 1986

Related U.S. Application Data

[63] Continuation of Ser. No. 792,250, Oct. 30, 1985, abandoned, which is a continuation of Ser. No. 536,081, Sep. 26, 1983, abandoned.

[51] Int. Cl.$^4$ .............................................. H02M 1/14
[52] U.S. Cl. ........................................ 363/45; 363/21; 363/97
[58] Field of Search ...................... 363/19, 20, 21, 39, 363/45, 97

[56] References Cited

U.S. PATENT DOCUMENTS

| | | |
|---|---|---|
| 1,015,494 | 1/1912 | Kitsee . |
| 1,329,842 | 2/1920 | Martin . |
| 1,362,613 | 12/1920 | Espenschied . |
| 1,490,031 | 4/1924 | Schmidt . |
| 1,712,677 | 5/1929 | Peter . |
| 1,719,107 | 7/1929 | Ebeling . |
| 1,724,607 | 8/1929 | Lincoln . |
| 1,738,408 | 12/1929 | Trump . |
| 1,774,822 | 9/1930 | Andrewes . |
| 1,835,395 | 12/1931 | Hentschel . |
| 1,857,830 | 5/1932 | Whittle . |
| 1,861,524 | 6/1932 | Coolidge . |
| 1,863,651 | 6/1932 | Chapman . |
| 1,915,442 | 6/1933 | Nyquist . |
| 1,920,948 | 8/1933 | Crouse . |
| 1,928,735 | 10/1933 | Nyquist ............................. 179/78 |

(List continued on next page.)

FOREIGN PATENT DOCUMENTS

| | | |
|---|---|---|
| 1232249 | 11/1963 | Fed. Rep. of Germany . |
| 1422994 | 11/1964 | France . |
| 271132 | 2/1926 | United Kingdom . |

OTHER PUBLICATIONS

IBM TDB, Conner et al, vol. 24, No. 10, 3/82, pp. 5255-5256.
IBM TDB, Contino et al, vol. 22, No. 2, 7/79, pp. 632-633.
Matsuo, "Comparison of Multiple-Output DC-DC Converters Using Cross-Regulation", IEEE Trans. on Indus. Elec. and Control Instr., vol. 27, No. 3, pp. 176-189.
Bloom & Eris, "Practical Design Considerations of a Multi-Output Cuk Converter", IEEE PESC, 1979 Record.
Electronics, Aug. 21, 1967, pp. 93-97, "Choking on LC Filters" by Allen G. Lloyd.
Patent Abstracts of Japan, vol. 5, No. 15 (E-43)[687], 1/29/81.

Primary Examiner—Peter S. Wong
Assistant Examiner—Anita M. Ault
Attorney, Agent, or Firm—Frederick D. Poag; Manny W. Schecter

[57] ABSTRACT

A power supply circuit for producing at least one output which is essentially free from current ripple is disclosed. A chopped DC voltage source is applied to a transformer having a primary coil and at least two secondary coils. The secondary coils provide input voltages to output stages which each include a rectifier diode, a freewheeling diode and an LC filter. The inductors in the LC filter of adjacent output stages are magnetically coupled together. The characteristics of these inductors are selected such that the current ripple through the inductors in all the output stages, other than the first output stage, is essentially zero. Multiple inductors can also be employed in the first output stage with each one being magnetically coupled to the inductor in a different succeeding output stage.

These multiple inductors in the first output stage can be combined in series or in parallel. A chained approach to coupling inductors as well as the use of an add-on ripple transformer can also be employed to product at least one essentially ripple-free output.

34 Claims, 14 Drawing Figures

U.S. PATENT DOCUMENTS

| | | | |
|---|---|---|---|
| 1,969,902 | 8/1934 | Roberts. | |
| 2,086,603 | 7/1937 | Cash. | |
| 2,216,545 | 10/1940 | Cannon | 178/69 |
| 2,466,629 | 4/1949 | Weaver. | |
| 3,229,184 | 1/1966 | Churchill. | |
| 3,657,631 | 4/1972 | Martens et al.. | |
| 3,705,365 | 12/1972 | Szabo et al. | 333/12 |
| 3,745,440 | 7/1973 | Lord | 363/17 |
| 3,777,248 | 12/1973 | Vermolen. | |
| 3,916,286 | 10/1975 | Waehner. | |
| 3,920,925 | 11/1975 | Lindow | 179/78 R |
| 3,996,537 | 12/1976 | Neuman | 333/78 |
| 4,042,872 | 8/1977 | McLeod | 363/23 |
| 4,163,906 | 8/1979 | Shimamura | 363/97 |
| 4,184,197 | 1/1980 | Cuk | 363/16 |
| 4,257,087 | 3/1981 | Cuk | 363/16 |
| 4,262,328 | 4/1981 | Bloom et al. | 363/16 |
| 4,274,133 | 6/1981 | Cuk et al. | 363/39 |
| 4,442,401 | 4/1984 | Jamieson | 323/351 |

CALCULATED MINIMUM INDUCTANCE $L_1$, CRIT TO MAINTAIN CONTINUOUS CURRENT THROUGH $L_2$ WITH $\Delta i_1 = 0$ FOR INDICATED RATIOS OF OUTPUT POWER $P_1/P_2$ CALCULATED RIPPLE AS A FUNCTION OF NORMALIZED TURNS RATIO, COUPLING FIXED AT k = 0.9, RIPPLE NORMALIZED TO UNCOUPLED (k = 0) CASE

COUPLED POWER SUPPLY INDUCTORS FOR REDUCED RIPPLE CURRENT

This application is a continuation of application Ser. No. 792,250 filed Oct. 30, 1985, now abandoned, which was a continuation of application Ser. No. 536,081 filed on Sept. 26, 1983, now abandoned.

TECHNICAL FIELD

The invention relates to the use of magnetically coupled output filter inductors to reduce inductor winding ripple currents and hence the output ripple voltages of a DC power supply which uses averaging LC output filters.

BACKGROUND ART

In most DC power supply applications, it is desirable to produce output voltage levels which do not vary. Undesirable variations can be produced by changes in input voltage levels, changes in loads on the supply, and temperature induced changes in component characteristics. In principle, these variations can be virtually eliminated by closed loop regulation. In addition to these types of variations, there are unwanted variations associated with the pulsating or discontinuous waveforms caused by the switching/rectifying function being performed within the supply (i.e., ripple). The conventional technique used to reduce the amplitude of an intolerable ripple is to enlarge the inductors and capacitors in each output. This approach naturally leads to bulky components.

It is possible to reduce the total volume of the magnetic components, and to reduce the number of components, by winding all the output inductors in a multi-output supply on one core. The resulting coupled inductor is not intended to provide any additional ripple reduction beyond uncoupled inductors. Indeed, such coupled inductors are constructed with turns ratios which preclude obtaining significant ripple reduction. These coupled inductors may provide some performance advantages related to cross regulation, and, in principle, provide at least some ripple reduction compared to uncoupled inductors.

Inductors coupled to deliberately obtain substantially reduced ripple have been used in some versions of the Cuk converter (see U.S. Pat. No. 4,184,197). This converter has an inductor in both the input and output circuits, so that by proper coupling, it is possible to obtain negligible ripple in either the input or output current. Extensions of coupled inductor Cuk converters include: (1) coupling of both input and output inductors to an intermediate transformer to obtain negligible ripple in both input and output inductors simultaneously and (2) coupling two output filter inductors to obtain negligible ripple in one output.

The body of background art concerned with the use of coupled inductors constructed to produce negligible ripple is constrained by
(1) use with only the Cuk converter;
(2) pairwise use, either input-output or two outputs and
(3) impractical implementations, which start with a fixed turns ratio and then minimize ripple by either adjusting the size of the air gap in the magnetic core, or by adding an uncoupled inductor of appropriate value in series with one of the windings.

DISCLOSURE OF THE INVENTION

The present invention provides for coupling at least two inductors to drastically reduce the ripple current in at least one output with no increase in the ripple current of another output. The present invention recognizes the full flexibility of coupled inductors to virtually eliminate ripple in at least one output. A dedicated ripple-reduction winding can also be used solely to cancel out the ripple in an output at a reduced cost or via a smaller filtering section. The present invention also provides several techniques for reducing the complexity of magnetic components coupled to the filter inductors of multiple output power supplies.

In addition, the present invention provides a technique for tailoring the characteristics of the magnetic output structure to obtain reduced ripple in a particular output by using uncoupled shunt inductors in parallel with the output windings (i.e., the circuit designer can choose to reduce ripple within a range from significant ripple in all outputs to essentially zero ripple in all but one output or reduced ripple in all outputs based on tradeoffs such as cost and performance). This parallel shunt configuration has at least two advantages over uncoupled series inductor configurations. First, the DC current can be split into the parallel shunt paths based on the resistance in each path. This ability to separate the DC current path from the components whose function is to control ripple might be used in two ways:
(1) the DC current could be placed nearly entirely in the shunt inductors, thus allowing the coupled windings to be constructed of light wire on a smaller core, or
(2) the DC current could be placed mainly in the coupled windings, thus allowing the tailoring or "trimming" shunt inductors to be of low current construction.

The second advantage of the use of parallel shunt inductors is that the converter could be operated for test without the shunt inductors, or with shunt inductors but without coupled inductors. Thus, active "trimming" of the ripple magnitude could be performed by inserting appropriate shunt elements without interrupting the high-current path.

These advantages also apply to coupled inductor versions of forward converters and other converters using "averaging" LC filters.

BEST MODE FOR CARRYING OUT THE INVENTION

Figure 1:
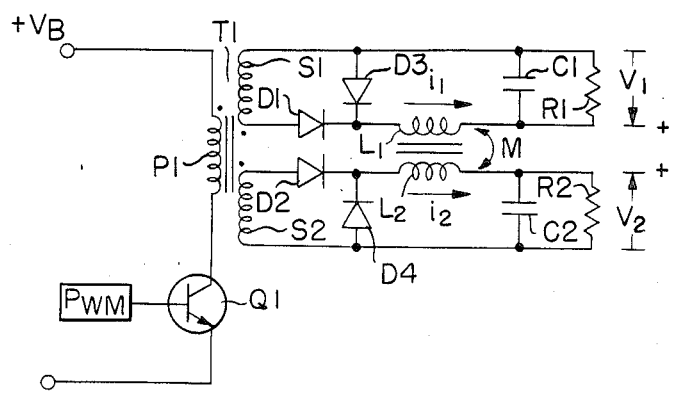
FIG. 1 is a power supply circuit embodying the present invention.

Coupling output filter inductors in a switched-mode forward averaging power supply introduces new flexibility in the filter design. This flexibility can be used to (a) drastically reduce the inductor current ripple in one output, while the other inductor current has ripple no worse than the uncoupled case; or (b) reduce the minimum inductance required to maintain continuous inductor current. A combination of these effects may also be obtained (i.e., a modest decrease in ripple current and required inductance). To obtain the minimum ripple, however, an increase in inductance, compared to the uncoupled case, may be required, if the uncoupled inductors were sized to just maintain continuous conduction. Even in this case, however, the increase is modest (20% to 30%) for outputs of comparable power.

The present invention provides negligible ripple current in all but one output filter of a multi-output DC supply that uses LC output filters (of course the circuit designer can also apply the present invention and still choose for cost reasons to reduce the ripple but not to the point where it is negligible). It produces this performance advantage by incorporating all the filter inductors into one component which magnetically couples all the inductor windings in a manner described by the induced open circuit voltage criterion explained below. The one output with ripple has ripple no larger than the ripple it would have if the magnetic coupling were zero. Furthermore, this one output with ripple may also be used solely to provide the ripple reduction for other outputs. Thus, even a single output supply can be provided with coupled inductor ripple reduction, by the addition of an "output" not used to deliver power to an external load, but dedicated to ripple reduction.

The characteristics which the coupled inductor magnetic component must have in order to produce the drastic ripple reduction in all but one output, with no increase over the uncoupled value for the one remaining output with ripple, can be described most easily in terms of open circuit induced voltages. In operation, the circuit imposes voltage on the inductor windings. For uncoupled inductors, each winding sustains its voltage by an appropriate time derivative of the current through the winding:

$$V_n(t) = L_n \cdot \frac{di_n(t)}{dt} \quad (1)$$

where
$v_n(t)$ = voltage across winding n
$L_n$ = inductance of winding n
$i_n(t)$ = current through winding n.

The voltages imposed on the various inductor windings of a given multi-output supply are in fixed ratios to each other. The voltages change in time during a cycle of operation of the supply, but they remain proportional to each other. For convenience of discussion of coupled inductors, the one winding with ripple will be designated as winding #1. With magnetic coupling, it is possible to have the voltage imposed on winding #j ($j \neq 1$) to be sustained, not by current change in winding #j, but through the mutual coupling $M_{1j}$, by current change in winding #1. Mathematically, $$v_1(t) = L_1 \cdot \frac{di_1(t)}{dt} \quad (2)$$

$$v_j(t) = M_{1j} \cdot \frac{di_1(t)}{dt} = \frac{M_{1j} v_1(t)}{L_1} \quad (3)$$

Since the voltages remain proportional, even though changing in time, no change in winding current #j is required. The current is a constant direct current. Furthermore, the winding with ripple (i.e., winding #1) performs as if it were an uncoupled winding; therefore, its ripple does not increase above the uncoupled case.

The required value of mutual inductance is defined mathematically by equation (3): $M_{1j}/L_1 = v_j/v_1$. An equivalent, more physical interpretation, however, is easily developed. If winding #j is disconnected from its filter (i.e., open circuited), but remains coupled to output #1, which is left intact and operating, then the induced open-circuit voltage observed across winding #j is identical to the voltage imposed on winding #j when it is connected. An equivalent out-of-circuit measurement can also be performed. If winding #1 is driven with a convenient test signal of known voltage amplitude, and the induced open circuit voltage on winding #j is measured, then the ratio of measured voltage on #j to test voltage on #1 should be the same ratio as the ratio of the voltage imposed on #j to the voltage imposed on #1 during circuit operation. If this criterion is met, then winding #j will have negligible current ripple. Since the designation of #j was arbitrary, it is evident that this criterion can be applied to the pair interaction of winding #1 and any number of other windings. Thus, the coupled inductor magnetic component which produces negligible ripple current in all but one winding is equivalent to a transformer constructed to provide a specified set of output voltages when driven at the winding intended to have ripple. The only additional requirement is that the core must be large enough to accommodate the DC flux from the direct currents flowing in the windings.

Despite the efforts to combine single inductors on one core for reduced component number, there may be cases in which a single coupled inductor component may not be desirable, even if it provides the ripple reduction advantages described above. Multi-winding components, whether transformers or coupled inductors, have problems of complexity, lead break-out, and discrete turns ratios. The present invention, therefore, provides several techniques for reducing the complexity of the coupled inductor while still maintaining the desired ripple reduction. Specifically, it provides techniques for obtaining negligible ripple current in all but one output filter using several separate components, each of which has only two windings. All of these techniques, however, extract penalties by requiring large inductances (more turns or larger cores) for at least some of the windings than would be required in a single component, if output filter #1 is to have ripple no worse than the uncoupled case.

In addition, the present invention provides a technique for adjusting the characteristics of the output filter structure to obtain reduced ripple in all but one output by using uncoupled shunt inductors in parallel with the coupled windings of the inductor. This parallel arrangement has at least two advantages over a series arrangement of uncoupled inductor and coupled winding, which has been used to tailor coupling in a Cuk converter. First, the DC current can be split into parallel paths based on the resistance of each path. This additional flexibility can be used in two ways:

(1) The DC current could be placed almost entirely in the shunt inductors, allowing the coupled windings to be constructed of light wire on a small core, or (2) The DC current could be placed almost entirely in the coupled windings, allowing the tailoring or trimming uncoupled shunt inductors to be of low current construction.

Second, the power supply can be operated for test without the shunt inductors, or with shunt inductors but without coupled inductors. Thus, active trimming of the ripple magnitude can be performed by inserting appropriate shunt elements without interrupting the high current path. Included in this concept is the use of ripple transformers which can be used to enhance the ripple performance of some outputs of power supplies previously designed with separate inductors.

The uncoupled shunt inductor approach has been compared here to the uncoupled series inductors used in a Cuk converter merely to provide a reference point. In fact the shunt inductor approach is applicable to the full range of power supply/converter circuits in which coupled filter inductors can be used. The shunt inductor or add-on ripple transformer approaches, however, either require more total inductance or allow larger ripple in the one output with ripple, than the single component multi-winding coupled inductor.

Referring to FIG. 1, the power supply output filters of the present invention include coupled inductors L1 and L2 as well as capacitors C1 and C2. Transformer T1, with primary, P1, provide plural transformer outputs S1 and S2, each with a rectifier diode (D1 and D2) and an LC freewheeling diode filter (L1, C1, L2, C2, D3 and D4). The two inductors L1 and L2 have parameters including self-inductance and mutual coupling (M) such that up to all of the ripple in one output V1 can be cancelled by operation of the other, V2. A typical usage is a forward transistor switching regulator (TSR) where it is desired that one output be ripple-free, and the other supplies a ripple-tolerant load or is used solely for the described operation with the first output. The loads are R1 and R2 and the TSR includes a switching transistor Q1 operated by a pulse width modulator control (PWM) to chop the DC $V_b$ applied to the primary P1 of T1 and provide the desired TSR regulation.

Figure 2:
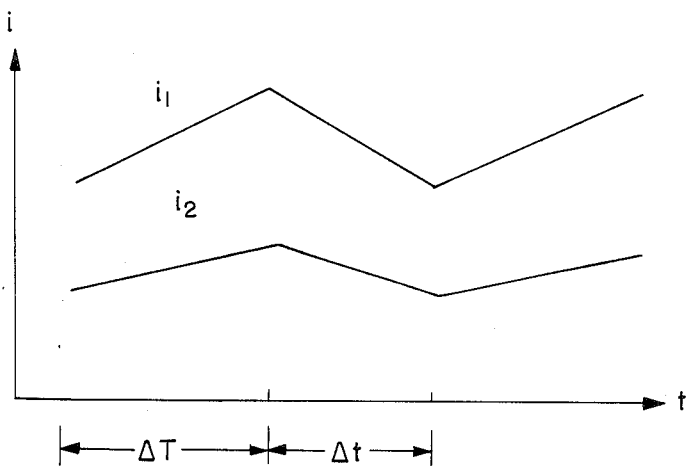
FIG. 2 is an illustration of the idealized current ripple waveforms present in a circuit using uncoupled inductors.
Figure 3:
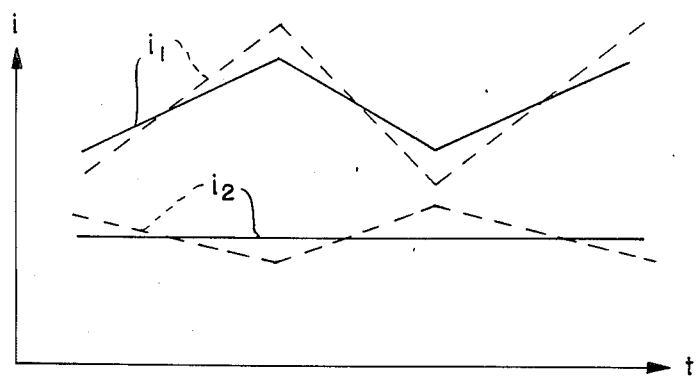
FIG. 3 is an illustration of current ripple waveforms for the circuit of FIG. 1 using two representative sets of circuit parameters.

The accompanying waveforms of FIG. 2 illustrate typical inductor currents for the common, uncoupled, design. FIG. 3 illustrates two possible waveforms (solid and dotted) that may be obtained with coupled inductors. In FIG. 2 and FIG. 3, $\Delta T$ and $\Delta t$ represent the ON and OFF times for Q1, respectively. More specifically, $\Delta T$ is the ON time for D1 and D2 and $\Delta t$ is the OFF time for D1 and D2. In order to succinctly describe the conditions for which these waveforms shown in FIG. 2 and FIG. 3 occur, it is necessary to define parameters which characterize the coupled inductors.

The degree of interaction between the inductors L1 and L2 is indicated by the coupling coefficient k. This parameter is the usual coupling coefficient of transformers, defined as the mutual inductance divided by the geometric mean of the self-inductances (i.e., $k = M/\sqrt{L1 \cdot L2}$). For any coupled inductor, the magnitude of k must be less than (or, in the limit, equal to) 1.

The other parameter needed is the turns ratio. A general rule is that inductance increases as the square of the turns in a winding increases. Following this rule, the turns ratio squared is equal to the inductance ratio for windings on a common core. This equality is a good approximation for multi-turn windings on a high permeability core, such as iron. However, for few turns on a ferrite core, the differences in winding details, such as position in the window or mean turn length, can cause measurable deviations from the simple equality between the square of the turns ratio and the ratio of self-inductances.

The general mathematical formulation describing transformers, used here for the coupled inductors, does not explicitly contain the turns, but readily yields expressions containing the square root of the inductance ratio. Thus, this parameter, not the turns ratio, is used here. Furthermore, if the ratio of the output voltages, V1 and V2 in FIG. 1, is also introduced, the algebra is simplified to that of an equal turns transformer.

The discussions and developments which follow, then, use a parameter defined as $$\tau_{12} = \frac{V2}{V1} \sqrt{\frac{L1}{L2}}, \quad (4)$$

which conceptually represents the turns ratio of coupled inductors for equal-voltage outputs, while maintaining generality and mathematical rigor. For convenience, $\tau$ is called, imprecisely, the normalized turns ratio.

Other work with coupled-inductor output filters have been constrained to the case of $\tau_{12} = 1$. Indeed, it has been purported that $\tau_{12}$ must equal one. This fallacy is based on two points: (1) for the time interval during which the free-wheeling diodes D3 and D4 conduct, the output voltages appear across the inductor windings, and (2) the voltage ratio for transformer windings (in this case, the coupled inductor) is equal to the turns ratio—that is, the volts per turn of the windings must be equal.

While point (1) is accurate when diode voltage drops and IR drops in the wiring are neglected, point (2) is correct only in the limit of tightly coupled windings (k=1). For example, if two inductors are uncoupled (k=0), no voltage is induced across one, no matter what voltage amplitude or waveform is applied to the other. The present invention addresses the advantages which may be obtained by using the flexibility of turns ratio and coupling strength of the coupled inductors.

For the discussions and analysis which follow, all components are assumed to be ideal (i.e., no capacitor equivalent series resistance, no winding resistance, no forward diode drop) and all voltage waveforms are assumed to be perfect square waves, with the output voltages V1 and V2 constant. While the exact values from an analysis based on these simplifying approximations may not be present in a practical circuit, they are significantly close. For example, while it may not be possible to achieve zero ripple in a practical, economical circuit, a drastic reduction can be expected.

Figure 4:
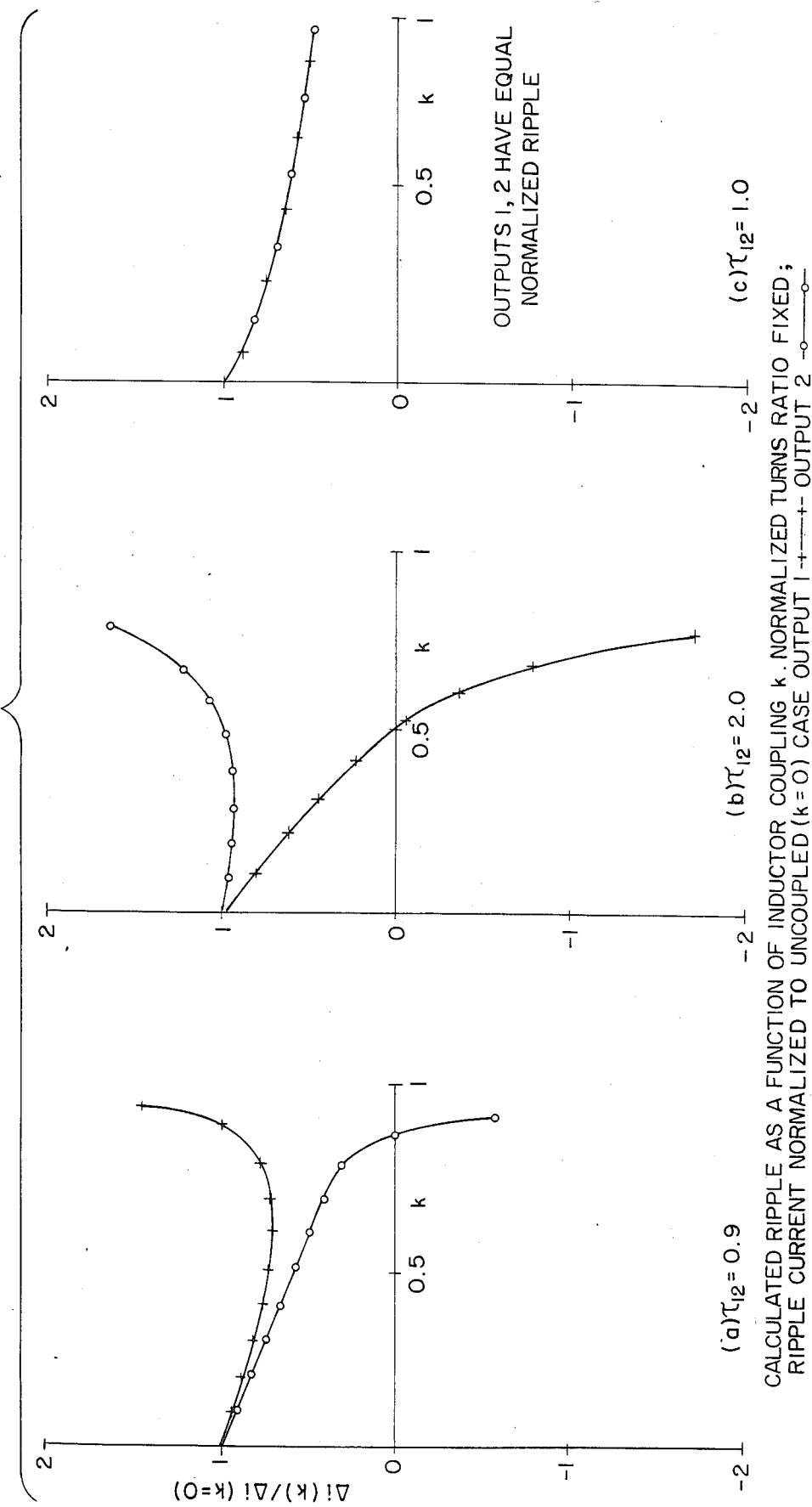
FIG. 4 is an illustration of the calculated ripple current for the circuit of FIG. 1 as a function of inductor coupling for various values of the normalized turns ratio.

Referring to FIG. 4, the calculated inductor current ripple is shown as a function of the coupling coefficient for three fixed normalized turns ratios. The ripple is normalized to the case of uncoupled inductors of the same values L1 and L2. Negative values of the ripple ratio indicate that the slope of the current during a time interval is of the opposite sign compared to the slope for the uncoupled case. This effect is illustrated by the dotted waveform $i_2$ in FIG. 3.

The plots of FIG. 4 demonstrate several features of the coupled inductor filter.

(A) If $\tau_{12} < 1$, there is a k for which the ripple in L2 goes to zero. For $\tau_{12} > 1$, the ripple in L1 can be eliminated. The critical values of k are $k = \tau_{12}$ and $k = 1/\tau_{12}$.

(B) At the value of k for which one ripple goes to zero, the other ripple is equal to the ripple for the uncoupled case. For example, at $k = \tau_{12}$, $\Delta i_2 = 0$ and $\Delta i_1 = -\Delta i_1(k=0)$.

(C) For $\tau_{12} = 1$, the minimum ripple ratio of $\frac{1}{2}$ occurs in the limit $k \to 1$. Zero ripple is not possible.

(D) If $\tau_{12}$ is chosen so that zero ripple occurs at a k value near 1, the magnitudes of both ripple currents are quite sensitive to small variations of k in the region of zero ripple (compare FIG. 4(a) and (b)).

Feature (D), above, would appear to encourage designs with modest, not tight, coupling. Maintaining continuous inductor current, however, favors tight coupling.

The output filter of FIG. 2 (L1, L2, C1 and C2) operates in the continuous conduction mode. To ensure continuous inductor current, the maximum variation in inductor current must not exceed twice the average current: $|\Delta i| \leq 2 \cdot i_{ave}$. For uncoupled inductors, the requirement becomes.

$$L \geq \frac{1}{2}(R)\Delta t = L_{crit}(k=0) \quad (5)$$

The most severe restriction occurs at light load (max. (R) and high bulk (max off time $\Delta t$).

Figure 5:
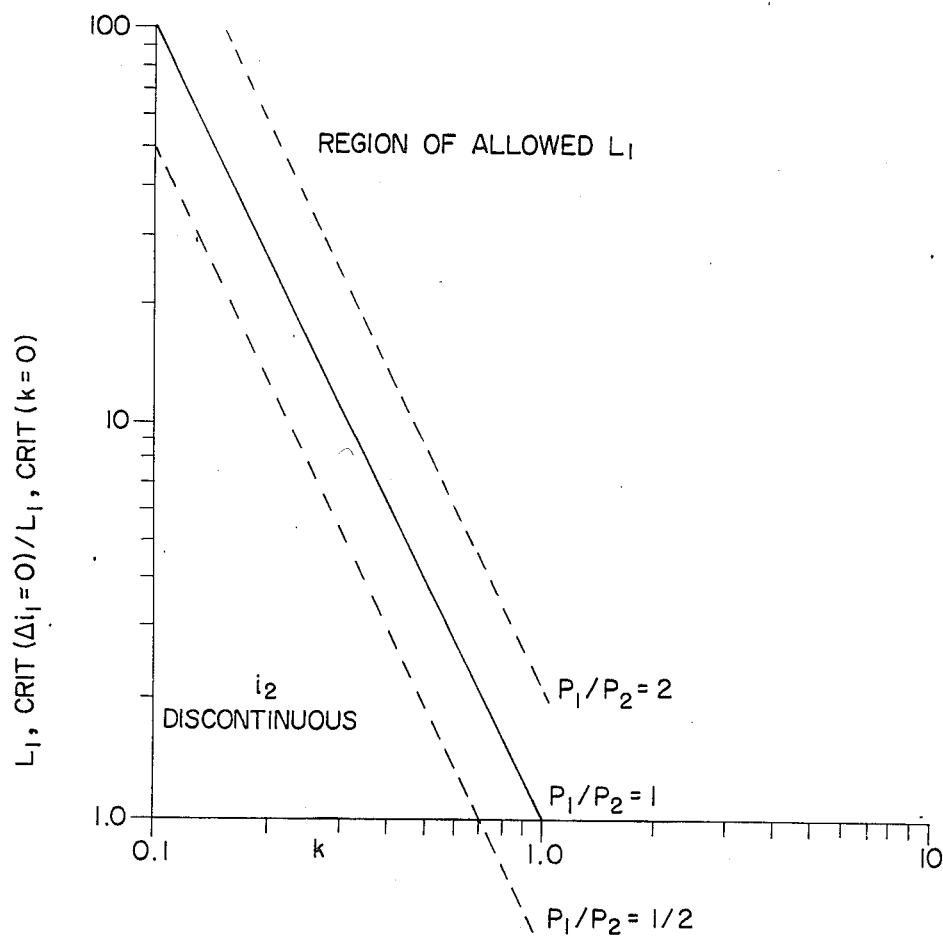
FIG. 5 is an illustration of the calculated minimum inductance required to maintain continuous inductor current for various output power ratios.

For coupled inductors, there are two conditions which must be satisfied: a direct condition (expression (5) generalized for $k \neq 0$) and a reflected condition based on the direct condition for the other output reflected back through the coupled inductors L1 and L2. As might be expected, this reflected condition depends on the relative power delivered by the outputs. Minimizing the ripple current of a high power output coupled to a low power output imposes a more severe restriction than the opposite case. FIG. 5 shows the calculated minimum L1 imposed by the reflected condition that $i_2$ be continuous, evaluated at $\Delta i_1 = 0$. If $\Delta i_1 = 0$, the direct condition on L1 is automatically satisfied by any $L1 > 0$. The reflected condition favors tight coupling to avoid large inductors.

In the discussion which follows, it is presumed that the power ratio P1/P2 is evaluated under the conditions of most severe restrictions. Furthermore, it is convenient to fix the coupling coefficient k and vary the normalized turns ratio $\tau_{12}$. Because of the interaction of these parameters, fixing both P1/P2 and $\tau_{12}$ is equivalent to fixing the inductor size margin, the factor by which L exceeds $L_{crit}$, in the uncoupled case. Such an analysis would be somewhat arbitrary since this factor would likely be chosen through experienced consideration of a number of ill-defined engineering compromises. Furthermore, varying $\tau_{12}$ with k fixed corresponds to a more practical adjustment. Changing the number of turns, a relatively easy manipulation, changes $\tau_{12}$. Changing k requires cumbersome shifts of winding positions on a core, or other core geometry changes such as adjustments of core gap. Thus, for presentation of calculations, k is fixed and $\tau_{12}$ varied.

Figure 6:
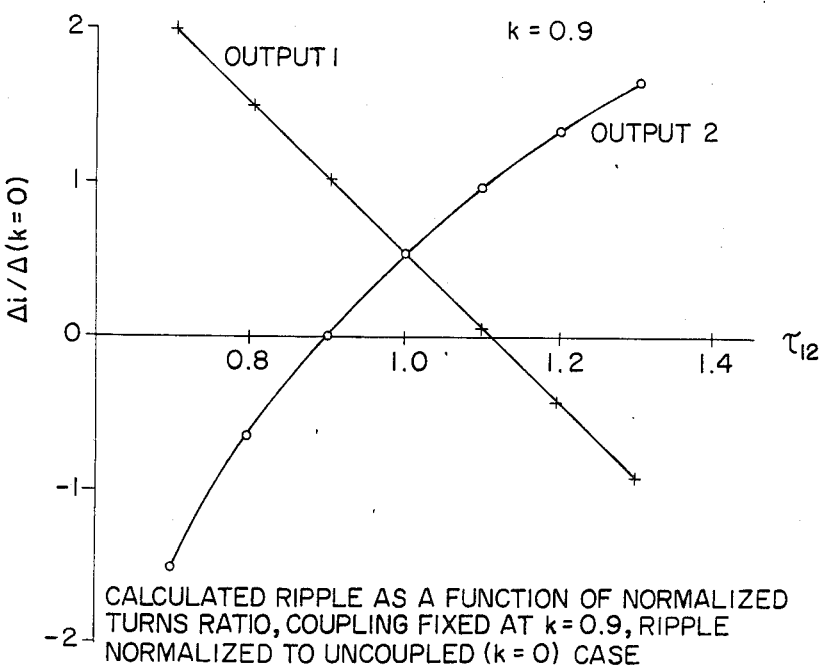
FIG. 6 is an illustration of the normalized calculated ripple as a function of the normalized turns ratio for a coupled case.
Figure 7:
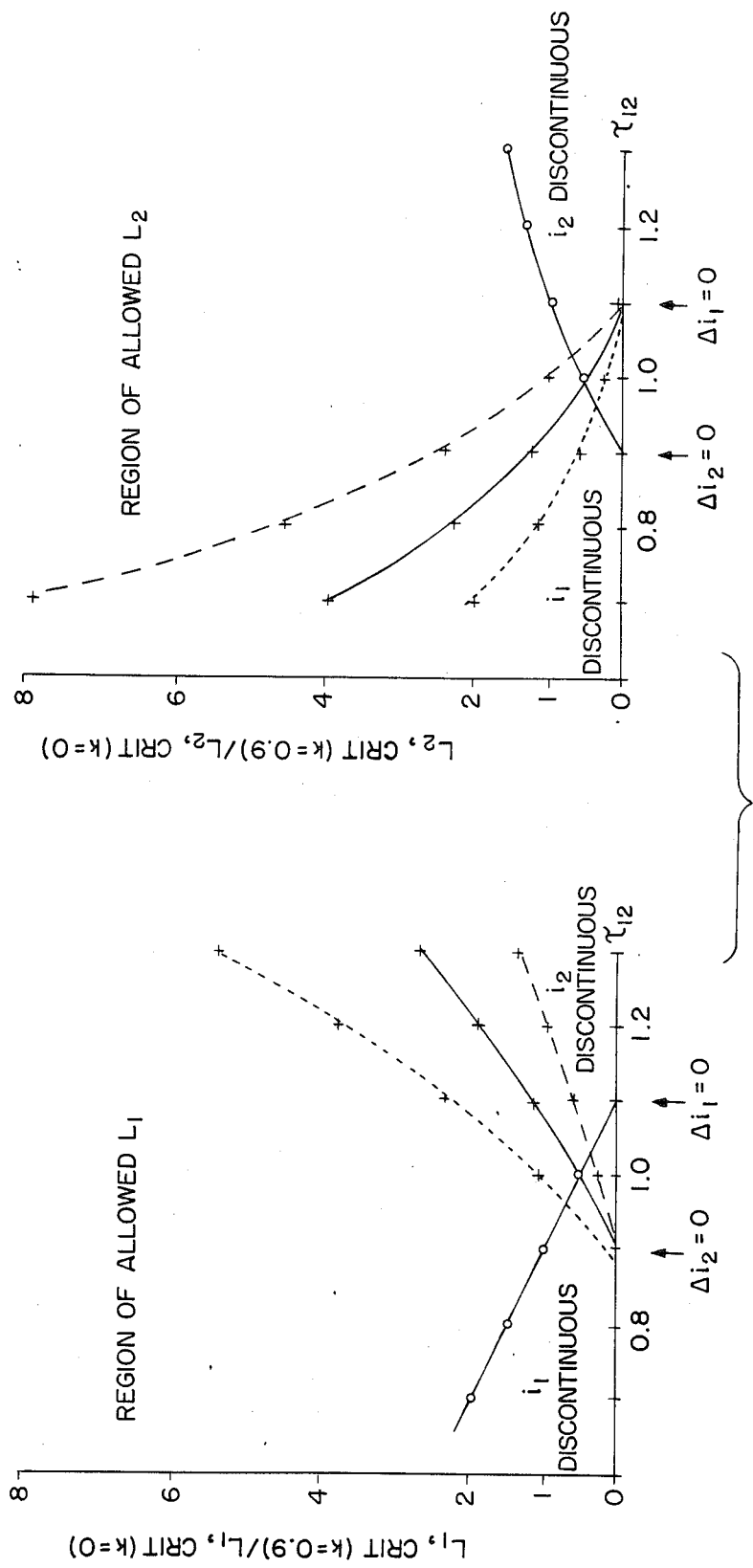
FIG. 7 is an illustration of the calculated minimum inductance required to maintain continuous inductor current.

FIG. 6 shows the calculated inductor current ripple as a function of the normalized turns ratio, with k fixed. FIG. 7 shows the calculated $L_{crit}$ for the same parameters used in FIG. 6. both direct conditions (independent of relative power) and reflected conditions (with P1/P2 as a parameter) are presented. Several features should be noted.

(A) For any power ratio, the minimum required inductance (where the direct condition crosses the reflected) occurs at the same $\tau_{12}$ for both outputs. For example, with P1/P2 = $\frac{1}{2}$, the minimum occurs at $\tau_{12} = 1.03$. This matching of minimum conditions of L1 and L2 occurs for any fixed P1/P2 and k, and provides a minimum total required inductance solution, with some ripple improvement over the uncoupled case.

(B) At zero ripple, a substantial increase of $L_{crit}$ beyond the uncoupled value occurs only if the zero ripple output is coupled to one of lower power. Expressed differently, the power which output 2 must handle to provide zero ripple in output 1 is $P2 \geq \frac{1}{2}$ $$\frac{V_1 \Delta i_1(k=0)}{k^2}.$$

This result is particularly useful for sizing "outputs" dedicated to ripple reduction.

(C) There is a range of effects available, including a reduction in both ripple current and required inductance for both outputs.

(D) While $\tau_{12} = 1$ approximately halves the ripples and required inductances, this choice does not allow maximum ripple reduction for either output, nor does it yield the minimum $L_{crit}$ if the output powers are unequal.

It seems reasonable to expect similar versatility and constraints in modes other than continuous condition, and other circuits using coupled inductors in this manner. These other situations, however, require case by case investigation.

It is tempting to consider connecting the coupled inductors with opposite sense, cancelling the DC core inductors with opposite sense, cancelling the DC core flux, and thereby achieving a reduction in the core size needed to obtain a required AC inductance. In the analysis here, such a connection is equivalent to changing the sign of k so it has values in the range of $-1 < k \leq 0$. Such a connection, however, would significantly increase both the ripple and minimum required inductance for both outputs. Thus, DC flux cancellation appears to be unpromising.

Summarizing the discussions above, coupling output inductors introduces new flexibility in design, with the capability to significantly reduce the current ripple in one inductor. The desired values of coupling and turns ratio must be determined by considering the relative output powers and choosing some compromise of ripple magnitude, required inductor size, and sensitivity to small parameter variations.

A thorough explanation of the detailed mathematics specifically associated with FIGS. 1-7 are as follows The voltage-current relations for a two winding lossless transformer are:

$$V1 = L1\frac{di_1}{dt} + M\frac{di_2}{dt} \text{ and} \tag{6}$$

$$V2 = M\frac{di_1}{dt} + L2\frac{di_2}{dt}. \tag{7}$$

Solving equations (6) and (7) for the current changes yields $$\Delta i_1 = \int V1 \frac{(1-k\tau_{12})}{(1-k^2)} dt \tag{8}$$

and $$\Delta i_2 = \int V2 \frac{(1-k/\tau_{12})}{(1-k^2)} dt \tag{9}$$

where $$k = M/\sqrt{L1 \cdot L2} \tag{10}$$

and $$\tau_{12} = \frac{V2}{V1}\sqrt{L1/L2} \tag{11}$$

For the case considered here, $V_1$ and $V_2$ are constant in time, which simplifies the integration. However, during the time interval of D3 and D4 off, the output voltages appear across the inductors with a polarity opposing the average inductor current. Thus, $$\Delta i_1 = \frac{-V1(1-k\tau_{12})\Delta t}{L1(1-k^2)} = \Delta i_1 (k=0)\frac{(1-k\tau_{12})}{(1-k^2)} \text{ and} \tag{12}$$

$$\Delta i_2 = \frac{-V2(1-k/\tau_{12})\Delta t}{L2(1-k^2)} = \Delta i_2 (k=0)\frac{(1-k/\tau_{12})}{(1-k^2)}. \tag{13}$$

Equations (12) and (13) are plotted in FIG. 4 and FIG. 6. If $\tau_{12}=1$, $\Delta i_1/\Delta i_1(k=0)$ equakls $\Delta i_2/\Delta i_2(k=0)$ equals $(1-k)/1-k^2)=1/(1+k)$. This result is plotted in FIG. 4c. No zero ripple is possible.

The requirement of continuous inductor current, uncoupled case, is $$|\Delta i| \leq 2 \cdot i_{ave} \tag{14}$$

or $$\frac{V \cdot \Delta t}{L} < \frac{2V}{R} \tag{15}$$

or $$L \geq \frac{1}{2} R\Delta t = L_{crit} (k=0) \tag{16}$$

For the coupled case, the direct requirements are given by using equation (12) and (13) for $\Delta i$ in equation (14)

$$L1 \geq \frac{1}{2}(R1) \Delta t \frac{(1-k\tau_{12})}{(1-k^2)} = L1_{crit}(k=0)\frac{(1-k\tau_{12})}{(1-k^2)} \tag{17}$$

-continued
and $$L2 \geq \frac{1}{2}(R2) \Delta t \frac{(1-k/\tau_{12})}{(1-k^2)} = L2_{crit}(k=0)\frac{(1-k/\tau_{12})}{(1-k^2)} \tag{18}$$

and

The reflected requirements are derived using equation (11).

$$L1 = \tau_{12}^2 (V1/V2)^2 L2 \geq \tau_{12}^2 (V1/V2)^2 L2_{crit} \tag{19}$$

$$= \tau_{12}^2 (V1/V2)^2 (R2)\Delta t \frac{(1-k/\tau_{12})}{(1-k^2)}$$

$$= \tau_{12}^2 (V1/V2)^2 (R2/R1) \tfrac{1}{2}(R1) \Delta t \frac{(1-k/\tau_{12})}{(1-k^2)}$$

or $$L1 \geq \tau_{12}^2 (P1/P2) \frac{(1-k/\tau_{12})}{(1-k^2)} L1_{crit} (k=0) \tag{20}$$

Similarly, $$L2 \geq \frac{1}{\tau_{12}^2} (P2/P1) \frac{(1-k\tau_{12})}{(1-k^2)} L2_{crit} (k=0) \tag{21}$$

From equations (12) and (13), the inductor conditions may be expressed as

| Direct Condition | Reflected Condition |
|---|---|
| $\frac{L1}{L1_{crit}(k=0)} \geq \frac{\Delta i_1}{\Delta i_1 (k=0)}$ and $\tau_{12}^2 (P1/P2) \frac{\Delta i_2}{\Delta i_2 (k=0)}$ | (22) |
| $\frac{L2}{L2_{crit}(k=0)} \geq \frac{\Delta i_2}{\Delta i_2 (k=0)}$ and $\frac{1}{\tau_{12}^2} (P2/P1) \frac{\Delta i_1}{\Delta i_1 (k=0)}$ | (23) |

If $k=1/\tau_{12}$, $\Delta i_1=0$ and the direct condition on L1 vanishes, as does the reflected condition on L2. Furthermore, since $\Delta i_2$ is equal to the uncoupled case, the direct condition on L2 is the same as for the uncoupled case. However, the reflected condition on L1 remains.

$$L1(\Delta i_1=0) \geq (1/k^2)(P1/P2)L1_{crit}(k=0). \tag{24}$$

This result is plotted in FIG. 5.

Finally, if the uncoupled inductors have size factors $f_1$ and $f_2$—that is, if $$L1 = f_1 L1_{crit}(k=0) \text{ and } L2 = f_2 L2_{crit}(k=0), \tag{25}$$

where $f_1$, $f_2 > 1$ then $$\frac{f_1}{f_2} = \frac{L1}{R1} \cdot \frac{R2}{L2} = \tau_{12}^2 \left(\frac{V1}{V2}\right)^2 \frac{R2}{R1} = \tau_{12}^2 \frac{P1}{P2} \tag{26}$$

Thus, if both $\tau_{12}$ and P1/P2 are fixed in the presentation of calculated values, there is a hidden assumption of a fixed size factor ratio for the uncoupled inductors.

Figure 8:
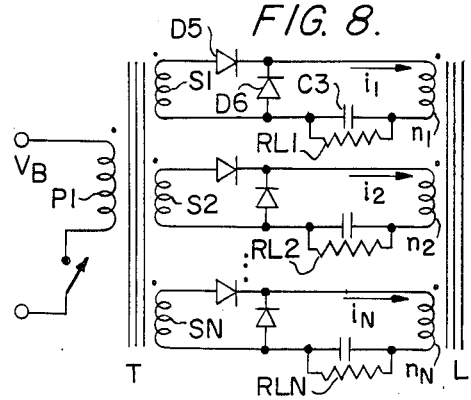
FIG. 8 is a multi-output power supply circuit for obtaining reduced current ripple in all but one output embodying the present invention.

Referring now to FIG. 8, it is also possible to obtain reduced (ideally zero) current ripple in all but one output of an averaging filter supply by using a multi-winding extension of the two winding coupled inductor filter in the present invention illustrated in FIG. 1. FIG. 8 illustrates this approach which employs a complex inductor L to magnetically couple coils $n_1$ through $n_n$ together. Here the coupled inductor L, which is designed to otain no di/dt in currents $i_2$ through $i_n$, and hence no ripple voltage across loads RL2 through RLN, has nearly as many windings as the multi-output transformer T. Such a component may be unduly cumbersome and can present problems in lead break-out and discrete turns ratio similar to those encountered in T.

Figure 9:
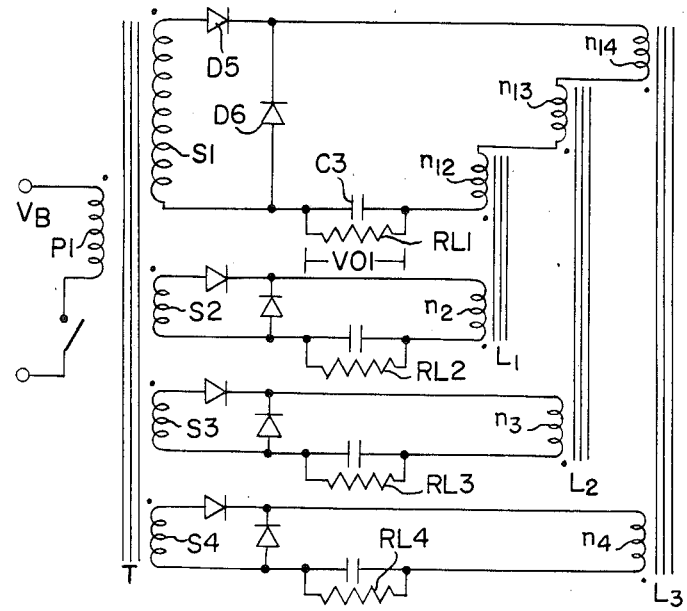
FIG. 9 is a multi-output power supply circuit embodying the present invention.
Figure 10:
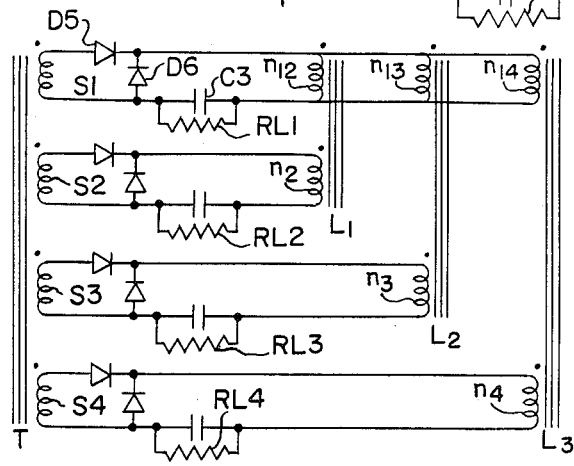
FIG. 10 is another multi-output power supply circuit embodying the present invention.
Figure 11:
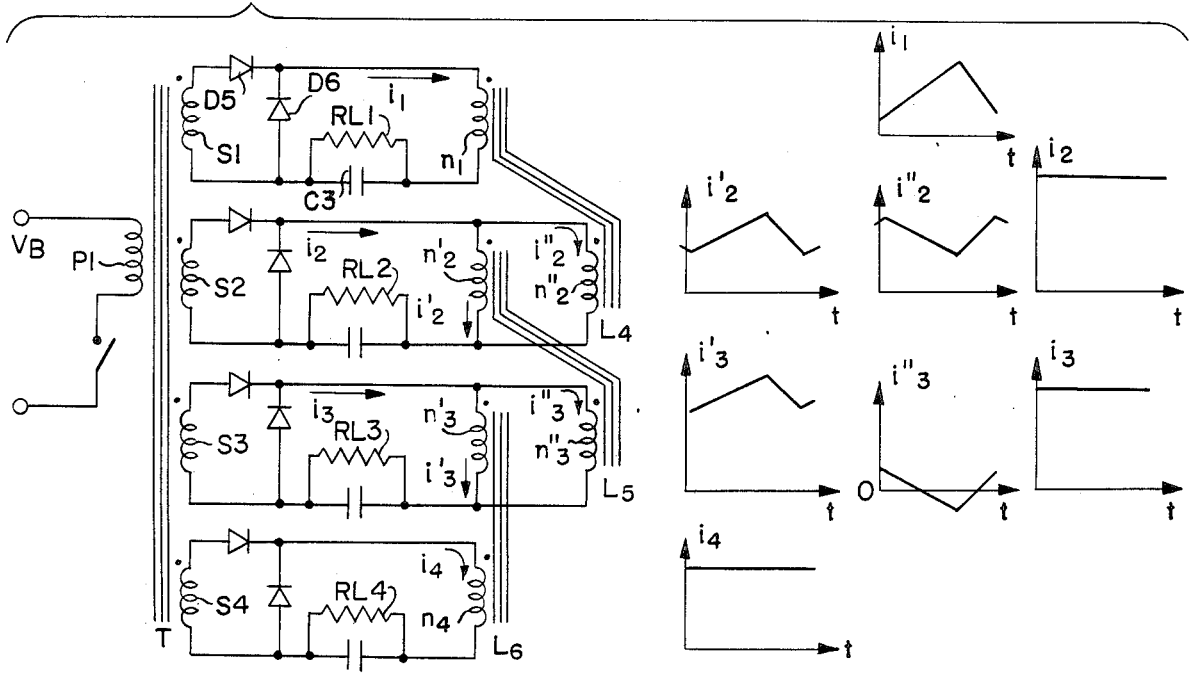
FIG. 11 is still another multi-output power supply circuit embodying the present invention.

Referring to FIGS. 9–11, the present invention can also be applied to multi-output power supplies to reduce the complex of inductor L used in FIG. 8. Specifically, FIG. 9 illustrates an embodiment of the present invention which employs three separate (i.e., uncoupled) series inductors, $n_{12}$, $n_{13}$ and $n_{14}$ in the first output stage of a four output stage power supply(i.e., N−1 series inductors are used in the first output stage for an N output stage power supply). Each of the three inductors L1, L2 and L3 can now be separately designed to provide zero ripple in outputs 2–4. Each inductor, however, now has to do this job with only a fraction of V01 voltage. To obtain zero ripple, then, for comparable couplings, requires that the turns ratios $n_2/n_{12}$, $n_3/n_{13}$ and $n_4/n_{14}$ in this embodiment be larger than the ratios $n_2/n_1$, $n_3/n_1$, $n_4/n_1$, etc. in FIG. 8.

Referring now to FIG. 10, the present invention can also be embodied using three separate parallel (i.e., uncoupled) inductors $n_{12}$, $n_{13}$ and $n_{14}$ in the first output stage. Again, as in FIG. 9, each of the three inductors can now be separately designed to provide zero ripple in output stages 2–4. In contrast to FIG. 9, the turns ratios $n_2/n_{12}$, $n_3/n_{13}$, $n_4/n_{14}$ in FIG. 10 will be comparable to the corresponding ratios $n_2/n_1$, $n_3/n_1$, $n_4/n_1$ in FIG. 8. The effective inductance in the first output stage, however, is the parallel combination of windings with turns $n_{12}$, $n_{13}$ and $n_{14}$. Thus, the inductance of each of these windings must be larger than the inductance of winding $n_1$ in FIG. 8, so that the parallel combination provides a comparable inductance for the first output stage. Furthermore, care must be taken to ensure that the DC current in the first output stage splits in such a manner that each winding $n_{12}$, $n_{13}$ and $n_{14}$ maintains continuous current throughout the switching period.

Referring now to FIG. 11, the present invention can also be embodied using a chaining approach with two parallel windings not coupled to one another. This approach uses the ability of coupled inductors to produce a reversal in direction of di/dt, compared to uncoupled inductors. Thus, although output stages 2–4 have zero ripple, only winding $n_4$ carries current with zero ripple. In output stages 2 and 3, the parallel windings carry current with compensating variations, so that the sum is a constant current, as shown in the sketched waveforms in FIG. 11. In those parallel windings is the zero-ripple outputs, there is no need to govern the DC current split. The current in one winding may reverse direction without causing discontinuous operation, as shown in the sketch of $i_3''$. In this approach, the turns ratios $n_2''/n_1$, $n_3''/n_2'$, will need to be larger, for comparable coupling, than the corresponding ratios $n_2/n_1$, $n_3/n_2$ in FIG. 8, although the increase is modest. Furthermore, the effective inductance which winding $n_1$ presents to the first output stage will be somewhat less than the uncoupled inductance. (In FIG. 8, the effective inductance of $n_1$ is equal to its uncoupled value.)

Any given set of electrical, manufacturing, and packaging constraints may favor one of the embodiments set forth in FIGS. 9–11, or may suggest a combination. All of these embodiments have the feature of allowing the designer to obtain N−1 ripple-free outputs using magnetic structures having no more than two windings each. The FIG. 11 embodiment has the unique feature of using the sign-reversal of di/dt to compensate for the conventional ripple in a parallel inductor.

While these embodiments have been presented for output stages of a forward-averaging supply, they would work as well with other switcher circuits using similar inductor-capacitor averaging output stages. In addition, they would work in a coupled inductor, multi-output converter, in which the input is magnetically coupled to multiple outputs.

In order for the two-winding structures to operate properly in the above approaches, they must satisfy the appropriate coupling-turns ratio conditions derived above with respect to FIG. 1–7.

Figure 12A:
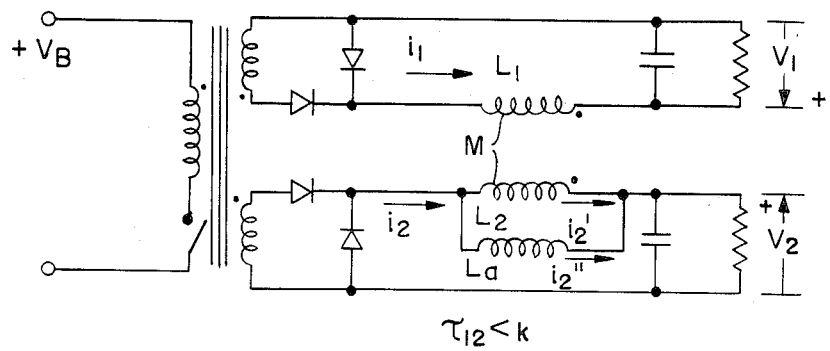
FIG. 12 is yet another power supply circuit embodying the present invention.

Referring now to FIG. 12a, the present invention can also be embodied using an uncoupled inductor in parallel with a winding. Some previous DC to DC converters have used separate, uncoupled inductors in series with the coupled inductor windings in order to tailor the characteristics of the magnetic structure to obtain reduced (ideally zero) current ripple in a particular winding. The embodiment of the present invention set forth in FIG. 12a accomplishes the same results by instead using uncoupled shunt inductors in parallel with the windings. The use of parallel shunt inductors has two significant advantages over series inductors. First, the DC current is split into the two shunt paths based on the DC resistance in each path. This ability to separate the DC current path from the components whose function is to control ripple might be used in two ways:

(1) The DC current could be placed nearly entirely in the shunt inductors, thus allowing the coupled windings to be constructed of light wire on a smaller core, or (2) The DC current could be placed mainly in the coupled windings, thus allowing the tailoring or "trimming" shunt inductors to be of low current construction.

The second advantage of the use of the parallel shunt inductors is that the converter could be operated for test without the shunt inductors, or with shunt inductors but without coupled inductors. Thus active "trimming" or the ripple magnitude could be performed by inserting appropriate shunt elements without interrupting the high-current path.

Figure 12B:
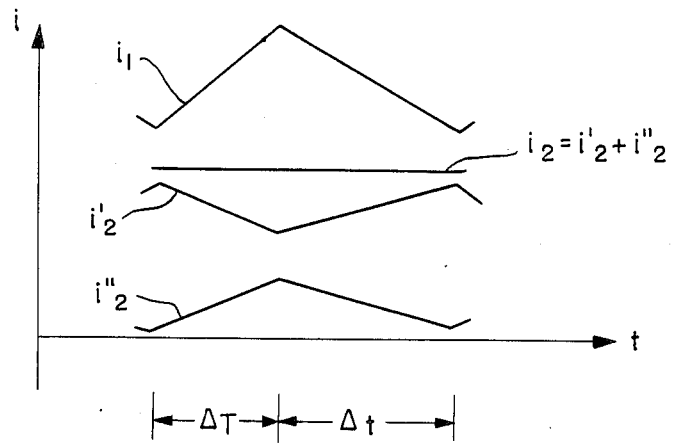

These advantages also apply to coupled-inductor versions of forward converters and other converters using "averaging" LC filters. FIG. 12b illustrates the currents present in the circuit of FIG. 12a.

Figure 12C:
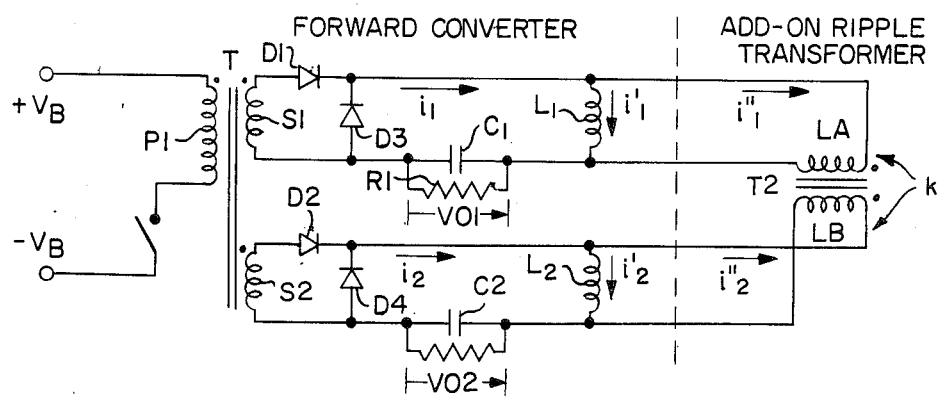

The embodiment of the present invention illustrated in FIG. 12c employs an add-on ripple transformer T2. This add-on ripple transformer T2 is added to an existing converter to reduce the current ripple in the second output stage (i.e., V02) to essentially zero at the expense of only a small ripple increase in the first output stage (i.e., V01). The requirement that $di_2'/dt$ (i.e., conventional ripple)+$di_2''/dt$ (i.e., negative ripple)=0 results in the constraint that $$\frac{VO1}{VO2} = \frac{1}{K} \sqrt{\frac{LA}{LB}} \left[ 1 + \frac{LB\sigma}{L2} \right] \qquad (27)$$

where $\sigma = 1 - K^2$.

The ripple added in the first output stage is given by the added change in $\Delta i$, during the off-time $$\Delta i_1 = \Delta i_1' + \Delta i_1'' = \frac{-VO1\,(T_{off})}{L1} \quad \text{(i.e., conventional ripple)} \qquad (28)$$

$$\frac{-VO1\,(T_{off})}{LA} \left[ \frac{LB + L2}{LB\sigma + L2} \right] \quad \text{(i.e., added ripple).}$$

In summary, then, the use of uncoupled shunt inductors with coupled inductors provides a means of separating the ripple reduction function from the DC high current path. Thus, it is a low cost, convenient means of obtaining zero ripple. It can also be extended to converters with more than two outputs, to obtain zero ripple in all but one output.

Whereas I have illustrated and described the preferred embodiments of my invention, it is understood that I do not limit myself to the precise constructions disclosed herein. I expressly reserve the right to all changes and modifications coming within the scope of the invention as defined in the appended claims.

I claim:

1. A power supply circuit with reduced ripple current for producing a first output and a second output comprising:
   a voltage source;
   a transformer having a primary input coil, a first secondary output coil for providing a first input voltage and a second secondary output coil for providing a second input voltage, said primary input coil being connected to said voltage source;
   a first diode connected to said first secondary output coil for rectifying said first input voltage;
   a second diode connected to said second secondary output coil for rectifying said second input voltage;
   a first filter means connected to said first secondary output coil and said first diode for filtering said first input voltage, said first filter means including a first inductor; and
   a second filter means connected to said second secondary output coil and said second diode for filtering said second input voltage, said second filter means including a second inductor magnetically coupled to said first inductor, the parameters of said inductors being chosen such that the induced open-circuit voltage across said second inductor (when said second inductor is disconnected from the remainder of said second filter means) is approximately identical to the imposed operating voltage on said second inductor when said second inductor is connected to the remainder of said second filter means, said ripple current through said second inductor being much lower than said ripple current through said first inductor.

2. A power supply circuit according to claim 1 wherein said first filter means additionally includes a first freewheeling diode for providing a path for the current through said first inductor when said voltage source is switched off and
   said second filter means additionally includes a second freewheeling diode for providing a path for the current through said second inductor when said voltage source is switched off.

3. A power supply circuit for producing a first output and a second output comprising:
   a means for reducing current ripple further comprising:
   a voltage source;
   a transformer having a primary input coil, a first secondary output coil for providing a first input voltage and a second secondary output coil for providing a second input voltage, said primary input coil being connected to said voltage source;
   a first diode connected to said first secondary output coil for rectifying said first input voltage;
   a second diode connected to said second secondary output coil for rectifying said second input voltage;
   a first filter means connected to said first secondary output coil and said first diode for filtering said first input voltage, said first filter means includes a first inductor; and
   a second filter means connected to said secondary output coil and said second diode for filtering said second input voltage, said second filter means includes a second inductor magnetically coupled to said first inductor, the parameters of said inductors being chosen such that the induced open-circuit voltage across said second inductor (when said second inductor is disconnected from the remainder of said second filter means) is identical to the imposed operating voltage on said second inductor when said second inductor is connected to the remainder of said second filter means, said ripple current through said second inductor being essentially zero.

4. A power supply circuit according to claim 3 wherein said first filter means additionally includes a first freewheeling diode for providing a path for the current through said first inductor when said voltage source is switched off and
   said second filter means additionally includes a second freewheeling diode for providing a path for the current through said second inductor when said voltage source is switched off.

5. A power supply circuit according to claim 1 or 3 wherein said voltage source is a chopped DC voltage source.

6. A power supply circuit according to claim 5 wherein said first filter means additionally includes a first freewheeling diode for providing a path for the current through said first inductor when said voltage source is switched off and
   said second filter means additionally includes a second freewheeling diode for providing a path for the current through said second inductor when said voltage source is switched off.

7. A power supply circuit for producing a plurality of outputs comprising:
   a voltage source;
   a transformer having a primary input coil connected to said voltage source and a plurality of secondary output coils, said plurality of secondary output coils providing a plurality of input voltages;
   a plurality of output stages for providing said plurality of outputs, each of said plurality of output stages connected to a different one of said plurality of secondary output coils, one of said plurality of output stages including a plurality of inductors while all the other of said plurality of output stages including only one inductor each, each one of said plurality of inductors being magnetically coupled to a different one of the inductors included in said other of said plurality of output stages, the parameters of said inductors being chosen such that the induced open-circuit voltage across the inductors of said output stages including only one inductor (when the inductors of said output stages including only one inductor are disconnected from the output stages in which they are included) is identical to the imposed operating voltage thereon when the inductors of said output stages including only one inductor are connected to the output stages in which they are included, the ripple current through said inductors included in said other of said plurality of output stages being essentially zero.

8. A power supply circuit according to claim 7 wherein said plurality of inductors are serially connected.

9. A power supply circuit according to claim 8 wherein said voltage source is a chopped DC voltage source.

10. A power supply circuit according to claim 7 wherein said plurality of inductors are connected in parallel.

11. A power supply circuit according to claim 10 wherein said voltage source is a chopped DC voltage source.

12. A power supply circuit according to claim 7, 8 or 10 wherein each of said other of said plurality of output stages additionally includes
   a rectifier diode connected to one of said plurality of secondary output coils for rectifying one of said plurality of input voltages and
   a freewheeling diode connected to said rectifier diode and one of said plurality of secondary output coils for providing a path for the current through the inductor included in said other of said plurality of output stages when said voltage source is switched off.

13. A power supply circuit according to claim 12 wherein said voltage source is a chopped DC voltage source.

14. A power supply circuit according to claim 7 wherein said voltage source is a chopped DC voltage source.

15. A power supply circuit for producing a plurality of outputs comprising:
   a voltage source;
   a transformer having a primary input coil connected to said voltage source and a plurality of secondary output coils, said plurality of secondary output coils providing a pluraity of input voltages;
   a first output stage connected to one of said plurality of secondary output coils for providing one of said plurality of outputs, said first output stage including a first inductor;
   a second output stage connected to a second one of said plurality of secondary output coils for providing a second one of said plurality of outputs, said second output stage including a second inductor and a third inductor, said third inductor being magnetically coupled to said first inductor; and
   a third output stage connected to a third one of said plurality of secondary output coils for providing a third one of said plurality of outputs, said third output stage including a fourth inductor, said fourth inductor being magnetically coupled to said second inductor, the parameters of said inductors being chosen such that the induced open-circuit voltage across said third inductor (when said third inductor is disconnected from said second output stage) is greater than the imposed operating voltage on said third inductor when said third inductor is connected to said second output stage, the ripple in the combined current through said second inductor and said third inductor and the ripple in the current through said fourth inductor being essentially zero.

16. A power supply circuit for producing a plurality of outputs comprising:
   a voltage source;
   a transformer having a primary input coil connected to said voltage source and a plurality of secondary output coils, said plurality of secondary output coils providing a plurality of input voltages;
   a first output stage connected to one of said plurality of secondary output coils for providing one of said plurality of outputs, said first output stage including a first inductor;
   a plurality of other output stages, each of said plurality of other output stages being connected to a different one of said plurality of secondary output coils and including a pair of inductors, one of said pair of inductors being magnetically coupled to an inductor included in a preceding output stage and the other of said pair of inductors being magnetically coupled to an inductor included in a succeeding output stage, the parameters of said inductors being chosen such that the induced open-circuit voltage across each inductor magnetically coupled to an inductor in a preceding output stage (when each inductor magnetically coupled to an inductor in a preceding output stage is disconnected from its respective output stage) is greater than the imposed operating voltage thereon when each inductor magnetically coupled to an inductor in a preceding output stage is connected to its respective output stage; and
   a final output stage connected to one of said plurality of secondary output coils for providing one of said plurality of outputs, said final output stage including a final inductor, said final inductor being magnetically coupled to an inductor included in the preceding output stage, the ripple in the combined current through each of said pair of inductors and the ripple in the current through said final inductor being essentially zero.

17. A power supply circuit for producing at least one output comprising:
   a voltage source;
   a transformer having a primary input coil connected to said voltage source and at least two secondary output coils for providing at least two input voltages;
   a first output stage connected to one of said at least two secondary output coils, said first output stage including a first inductor;
   a second output stage connected to another one of said at least two secondary output coils for providing an output, said second output stage including a second inductor; and an add-on transformer means for reducing current ripple, said add-on transformer means including at least a third inductor and a fourth inductor, said third inductor being magnetically coupled to said fourth inductor and connected in parallel to said first inductor, said fourth inductor being connected in parallel with said second inductor, the parameters of said inductors being chosen such that the induced open-circuit voltage across said fourth inductor (when said fourth inductor is disconnected from said second inductor) is greater than the imposed operating voltage on said fourth inductor when said fourth inductor is connected to said second inductor, the ripple in the combined current thrugh said second inductor and said fourth inductor being essentially zero.

18. A power supply circuit for producing at least one output comprising:
   a voltage source;
   a transformer having a primary input coil connected to said voltage source and at least two secondary output coils for providing at least two input voltages;
   a first output stage connected to one of said at least two secondary output coils, said first output stage including a first inductor; and
   a second output stage connected to another one of said at least two secondary output coils for providing said at least one output, said second output stage including a second inductor magnetically coupled to said first inductor, the parameters of said inductors being chosen such that the induced open-circuit voltage across said second inductor (when said second inductor is disconnected from said second output stage) is identical to the imposed operating voltage on said second inductor when said second inductor is connected to said second output stage, the ripple current through said second inductor being essentially zero.

19. A power supply circuit for producing a plurality of outputs comprising:
   a voltage source;
   a transformer having a primary input coil connected to said voltage source and a plurality of secondary output coils, said plurality of secondary output coils providing a plurality of input voltages; and
   a plurality of output stages for providing said plurality of outputs, each of said plurality of output stages connected to a different one of said plurality of secondary output coils, each of said plurality of output stages includes an inductor, each inductor being magnetically coupled to the inductors in the other output stages, the parameters of said inductors being chosen such that the induced open-circuit voltages across each inductor included in said plurality of output stages (when the inductors included in said plurality of output stages are disconnected from the respective output stages) is identical to the imposed operating voltages thereon when the inductors included in said plurality of output stages are connected to their respective output stages; and
   another output stage for providing another output, said another output stage connected to another of said secondary output coils, said another output stage also including an inductor magnetically coupled to each of the inductors included in said plurality of output stages, the ripple currents through the inductors included in said plurality of output stages being essentially zero.

20. A power supply circuit for producing a first output and a second output comprising:
   a voltage source;
   a transformer having a primary input coil, a first secondary output coil for providing a first input voltage and a second secondary output coil for providing a second input voltage, said primary input coil being connected to said voltage source;
   a first diode connected to said first secondary output coil for rectifying said first input voltage;
   a second diode connected to said second secondary output coil for rectifying said second input voltage;
   a first filter means connected to said first secondary output coil and said first diode for filtering said first input voltage, said first filter means includes a first inductor; and
   a second filter means connected to said second secondary output coil and said second diode for filtering said second input voltage, said second filter means includes a second inductor and a third inductor, said second inductor being magnetically coupled to said first inductor, the parameters of said inductors being chosen such that the induced open-circuit voltage across said second inductor (when said second inductor is disconnected from the remainder of said second filter means) is greater than the imposed operating voltage on said second inductor when said second inductor is connected to the remainder of said second filter means, the ripple in the combined current through said second inductor and said third inductor being much lower than the ripple in the current through said first inductor.

21. A power supply circuit with reduced ripple current for producing a first output and a second output comprising:
   a voltage source;
   a transformer having a primary input coil, a first secondary output coil for providing a first input voltage and a second secondary output coil for providing a second input voltage, said primary input coil being connected to said voltage source;
   a first diode connected to said first secondary output coil for rectifying said first input voltage;
   a second diode connected to said second secondary output coil for rectifying said second input voltage;
   a first filter means connected to said first secondary output coil through said first diode for filtering said first input voltage, said first filter means including a first inductor; and a second filter means connected to said second secondary output coil through said second diode for filtering said second input voltage, said second filter means including a second inductor magnetically coupled to said first inductor, the parameters of said inductors being chosen such that Tau is other than unity, where $Tau = V_2/V_1 \sqrt{L_1/L_2}$ and $L_1$ and $L_2$ are the self-inductances of the respective first and second coupled inductors and $V_1$ and $V_2$ are the respective first and second input voltages, said ripple current through said second inductor being much lower than said ripple current through said first inductor.

22. A power supply circuit according to claim 21 wherein said first filter means additionally includes a first freewheeling diode for providing a path for the current through said first inductor when said voltage source is switched off, and said second filter means additionally includes a second freewheeling diode for providing a path for the current through said second inductor when said voltage source is switched off.

23. A power supply circuit for producing a first output and a second output comprising:

a means for reducing current ripple further comprising:

a voltage source;

a transformer having a primary input coil, a first secondary output coil for providing a first input voltage and a second secondary output coil for providing a second input voltage, said primary input coil being connected to said voltage source;

a first diode connected to said first secondary output coil for rectifying said first input voltage;

a second diode connected to said second secondary output coil for rectifying said second input voltage;

a first filter means connected to said first secondary output coil through said first diode for filtering said first input voltage, said first filter means includes a first inductor; and a second filter means connected to said second secondary output coil through and second diode for filtering said second input voltage, said second filter means includes a second inductor magnetically coupled to said first inductor, the parameters of said inductors being chosen such that Tau is other than unity, where $Tau = V_2/V_1 \sqrt{L_1/L_2}$ and $L_1$ and $L_2$ are the self-inductances of the respective first and second coupled inductors and $V_1$ and $V_2$ are the respective first and second input voltages, said ripple current through said second inductor being essentially zero.

24. A power supply circuit according to claim 23 wherein said first filter means additionally includes a first freewheeling diode for providing a path for the current through said first inductor when said voltage source is switched off, and said second filter means additionally includes a second freewheeling diode for providing a path for the current through said second inductor when said voltage source is switched off.

25. A power supply circuit according to claim 21 or 23 wherein said voltage source is a chopped DC voltage source.

26. A power supply circuit according to claim 25 wherein said first filter means additionaly includes a first freewheeling diode for providing a path for the current through said first inductor when said voltage source is switched off, and said second filter means additionally includes a second freewheeling diode for providing a path for the current through said second inductor when said voltage source is switched off.

27. A power supply circuit for producing at least one output comprising:

a voltage source;

a transformer having a primary input coil connected to said voltage source and at least two secondary output coils for providing at least two secondary output coils for providing at least two input voltages;

a first output stage connected to one of said at least two secondary output coils, said first output stage including a first inductor; and a second output stage connected to said first output stage and another one of said at least two secondary output coils for providing one of said at least one outputs, said second output stage including a second inductor magnetically coupled to said first inductor, the parameters of said inductors being chosen such that Tau is other than unity, where $Tau = V_2/V_1 \sqrt{L_1/L_2}$ and $L_1$ and $L_2$ are the self-inductances of the respective first and second coupled inductors and $V_1$ and $V_2$ are the respective first and second input voltages, the ripple current through said second inductor being essentially zero.

28. A power supply circuit for producing a plurality of outputs comprising:

a voltage source;

transformer means having primary input coil means connected to said voltage source and a plurality of secondary output coil means of first and second classes, said plurality of secondary output coil means providing a plurality of input voltages; and output stage means of said first class connected to said secondary output coil means of said first class and including inductor means carrying ripple current, and a plurality of output stages of said second class for providing a plurality of outputs, each of said plurality of output stages of said second class connected to said secondary output coil means of said second class, each of said plurality of output stages of said second class including an inductor, each inductor being magnetically coupled to the inductor means of said output stage means of said first class, the parameters of said inductor means and said inductors being chosen such that the induced open-circuit voltages across each inductor included in said output stages of said second class (when the inductors included in said plurality of output stages of said second class are disconnected from their respective output stages) are approximately identical to the imposed operating voltages thereon when the inductors included in said plurality of output stages of said second class are connected to their respective output stages;

the ripple currents through the inductors included in said plurality of output stages of said second class being much lower than said ripple current in said inductor means of said first class.

29. A power supply circuit for producing a plurality of outputs comprising:

a voltage source;

a transformer having a primary input coil connected to said voltage source and a plurality of secondary output coil means of first and second classes, said plurality of secondary output coil means providing a plurality of input voltages; and output stage means of said first class connected to said secondary output coil means of said first class and including inductor means carrying ripple current, and a plurality of output stages of said second class for providing a plurality of outputs, each of said plurality of output stages of said second class connected to said secondary output coil means of said second class, each of said plurality of output stages of said second class including an inductor, each inductor being magnetically coupled to the inductor means of said output stage means of said first class, the parameters of said inductor means and said inductors being chosen such that the induced open-circuit voltages across each inductor included in said output stages of said second class (when the inductors included in said plurality of output stages of said second class are disconnected from their respective output stages) are substantially identical to the imposed operating voltages thereon when the inductors included in said plurality of output stages of said second class are connected to their respective output stages;

the ripple currents, arising from said imposed operating voltages, through the inductors included in said plurality of output stages of said second class being essentially zero.

30. A power supply circuit in accordance with claim 28 or claim 29 wherein said power supply circuit is a forward converter and wherein said output stages of said second class comprise averaging filters in which said inductors are filter inductors.

31. A power supply in accordance with claim 30, wherein all of said inductor means and said inductors are magnetically coupled by a common core.

32. A power supply circuit for producing a plurality of outputs comprising:

a voltage source;

transformer means having primary input coil means connected to said voltage source and secondary output coil means; and output stage means of a first class connected to said secondary output coil means and including inductor means carrying ripple current, and a plurality of output stages of a second class for providing a plurality of outputs, each of said plurality of output stages of said second class connected to said secondary coil means, each of said plurality of output stages of said second class including an inductor, each inductor being magnetically coupled to the inductor means of said output stage means of said first class, said output coil means imposing proportionally related voltages on said output stages, the parameters of said inductor means and said inductors being chosen such that the induced open-circuit voltages across each inductor included in said output stages of said second class (when the inductors included in said plurality of output stages of said second class are disconnected from their respective output stages) are approximately identical to the imposed operating voltages thereon when the inductors included in said plurality of output stages of said second class are connected to their respective output stages;

the ripple currents through the inductors included in said plurality of output stages of said second class being much lower than said ripple current in said inductor means of said first class.

33. A power supply circuit for producing a plurality of outputs comprising:

voltage source means;

output stage means of a first class connected to said voltage source means and including inductor means carrying ripple current, and a plurality of output stages of a second class for providing a plurality of outputs, each of said plurality of output stages of said second class connected to said voltage source means, each of said plurality of output stages of said second class including an inductor, each inductor being magnetically coupled to the inductor means of said output stage means of said first class, said voltage source means imposing proportionally related voltages on said output stages, the parameters of said inductor means and said inductors being chosen such that the induced open-circuit voltages across each inductor included in said output stages of said second class (when the inductors included in said plurality of output stages of said second class are disconnected from their respective output stages) are approximately identical to the imposed operating voltages thereon when the inductors included in said plurality of output stages of said second class are connected to their respective output stages;

the ripple currents through the inductors included in said plurality of output stages of said second class being much lower than said ripple current in said inductor means of said first class.

34. A power supply circuit as claimed in claim 32 or 33 wherein said ripple currents in said inductors are essentially zero.

* * * * *